(12) United States Patent
Jansen et al.

(10) Patent No.: US 6,881,347 B2
(45) Date of Patent: Apr. 19, 2005

(54) METHOD FOR REMOVING RADIOACTIVE SUBSTANCES FROM AFFECTING WATER WELLS

(75) Inventors: John R. Jansen, West Bend, WI (US); Steven H. Schultz, Waukesha, WI (US); Daniel R. Butler, Wauwatosa, WI (US)

(73) Assignee: Ruekert & Mielke, Inc., Waukesha, WI (US)

(*) Notice: Subject to any disclaimer, the term of this patent is extended or adjusted under 35 U.S.C. 154(b) by 123 days.

(21) Appl. No.: 10/341,790

(22) Filed: Jan. 14, 2003

(65) Prior Publication Data

US 2003/0132171 A1 Jul. 17, 2003

Related U.S. Application Data

(60) Provisional application No. 60/348,935, filed on Jan. 14, 2002.

(51) Int. Cl.[7] .................................................. C02F 1/28
(52) U.S. Cl. ........................ 210/670; 210/682; 210/747
(58) Field of Search ................................ 210/670, 682, 210/747, 170; 423/6, 17, 18, 20

(56) References Cited

U.S. PATENT DOCUMENTS

| | | | |
|---|---|---|---|
| 4,054,320 A | | 10/1977 | Learmont |
| 4,536,034 A | | 8/1985 | Otto, Jr. et al. |
| 4,973,201 A | | 11/1990 | Paul et al. |
| 5,196,124 A | | 3/1993 | Connor et al. |
| 5,728,302 A | | 3/1998 | Connor et al. |
| 5,840,191 A | * | 11/1998 | Eccles ........................ 210/638 |
| 5,846,434 A | * | 12/1998 | Seaman et al. ............. 210/724 |

* cited by examiner

*Primary Examiner*—Robert A. Hopkins
(74) *Attorney, Agent, or Firm*—George E. Haas; Quarles & Brady LLP

(57) ABSTRACT

The natural ability of an aquifer formation to remove radionuclides from ground water is recharged by injecting a leaching solution a well. The leaching solution replaces the radionuclides at natural sorption sites in the aquifer formation with ions that can be displaced subsequently by other radionuclides in the ground water. The leaching solution remains in the aquifer formation for a given period of time after which it is pumped out through the well. Thereafter, as water is pumped from the well, other radionuclides become lodged at the sorption sites in the aquifer formation thus being removed from the water.

16 Claims, 1 Drawing Sheet

METHOD FOR REMOVING RADIOACTIVE SUBSTANCES FROM AFFECTING WATER WELLS

CROSS-REFERENCE TO RELATED APPLICATIONS

This application claims benefit of U.S. Provisional Patent Application No. 60/348,935 filed Jan. 14, 2002.

STATEMENT REGARDING FEDERALLY SPONSORED RESEARCH OR DEVELOPMENT

Not Applicable

BACKGROUND OF THE INVENTION

1. Field of the Invention

The present invention relates to the treatment of potable water to remove radioactive materials, and more particularly to the subterranean removal of such radioactive materials from water adjacent a well.

2. Description of the Related Art

Water for human consumption commonly is obtained for a well drilled deep into the earth. As water is pumped from the well, minerals and other substances are carried by the water from the well into the water distribution system. Several radioactive isotopes occur naturally in ground water. Among the isotopes of greatest concern are radium 226, radium 228, and several members of their decay series that emit alpha particles, referred to collectively as "gross alpha". These radionuclides pose health threats and environmental problems in potable water supplied from the well.

In a municipal water system, the water drawn from a well frequently is processed above ground to remove undesirable substances, such as minerals which make the water "hard" inhibiting the cleaning action of soaps and detergents. Traditional methods of reducing radionuclide concentrations require substantial investments in treatment equipment and often create disposal problems for the process byproducts.

Attempts have been made at treating water while it still is in the aquifer. One of these involved injecting chemicals into the aquifer formation to filter out radionuclides as the water passed through the aquifer into the well. The chemicals either were injected as a slurry to deposit solids into the aquifer formation or were precipitated into the aquifer formation from a chemical reaction between two solutions. The common factor of these prior methods was the deposition of a solid that was foreign to the aquifer formation which solid then removed the radionuclides from the ground water around the well.

The prior in situ methods had to comply with governmental regulatory restrictions on injecting materials into aquifer formations which required that the wells be specially licensed. In addition, the process of depositing solids into the aquifer formation around a well has the undesirable effect of reducing the permeability of the formation. This may adversely affect the production capacity of the well or lead to undesirable precipitation reactions from chemical or biological processes which also can plug the formation over time.

Therefore, although subterranean treatment methods provided some improvement as compared to surface treatment processes, injection of foreign material into an aquifer formation to reduce radionuclides is generally considered undesirable and unnecessary.

SUMMARY OF THE INVENTION

A method is provided for treating an aquifer formation to remove radionuclides from ground water being pumped from a well. That treatment method introduces a leaching solution into the aquifer formation adjacent the well. The leaching solution replaces the radionuclides, such as uranium, radium, thorium, and their decay products, at natural sorption sites in the aquifer formation with ions that subsequently are displaceable by other radionuclides carried by the ground water. For example, the leaching solution may comprise magnesium chloride, sodium chloride, sodium bicarbonate, calcium chloride, ethylenediaminetetraacetic acid, or mixtures thereof. The leaching solution remains in the aquifer formation for a given period of time after which it is removed, such as by pumping from the well.

As water is pumped from the well following the treatment, radionuclides in the water are sorbed at the sorption sites in the aquifer formation thereby being removed from the water. Eventually the sorption sites become fully populated with other radionuclides and the treatment process has to be repeated to recharge the aquifer formation.

DETAILED DESCRIPTION OF THE INVENTION

Figure 1:
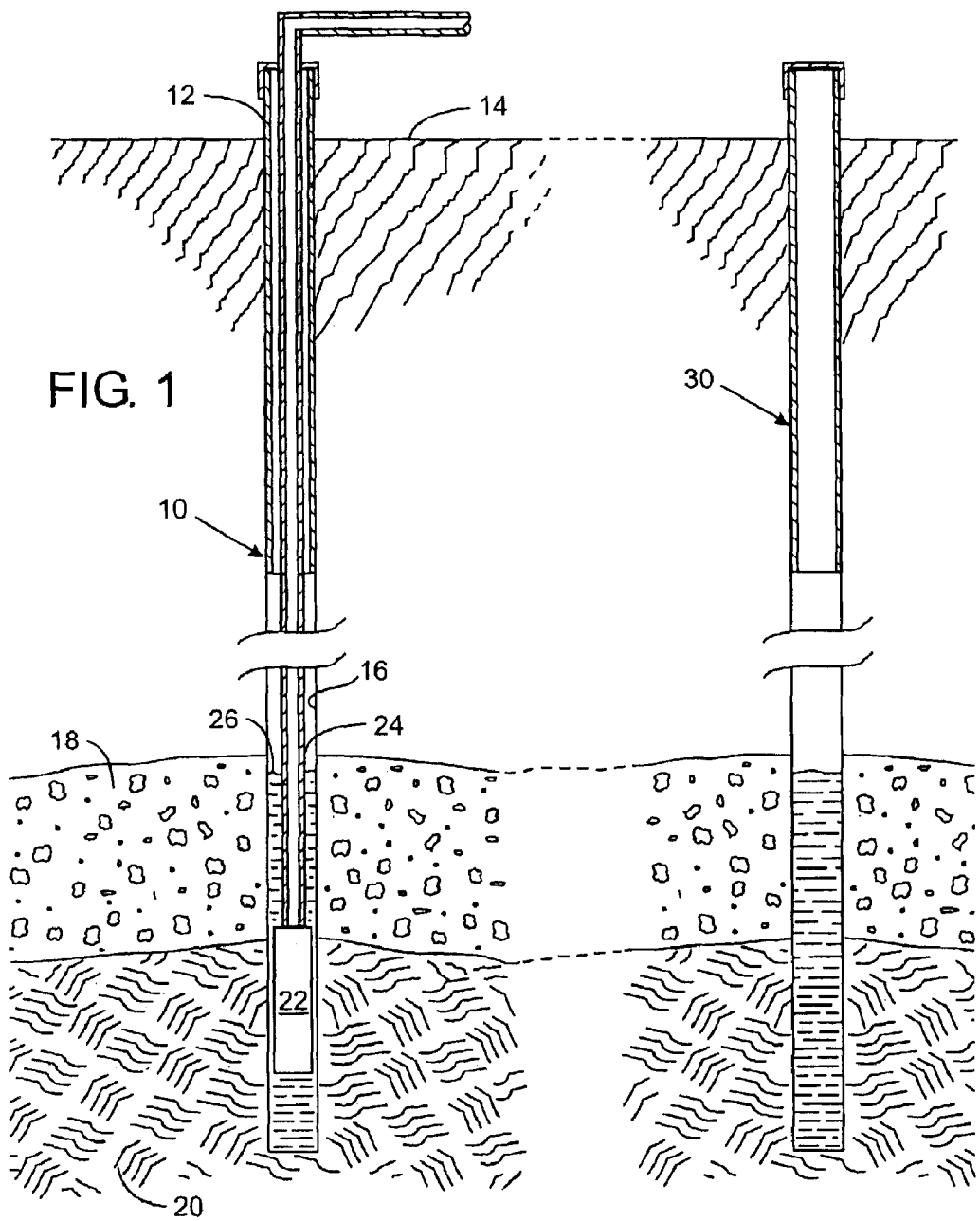
FIG. 1 is an illustration of a well for producing water and another treatment well, in which the present method can be used.

With initial reference to FIG. 1, a well 10 for producing potable water has a casing 12 which extends from the surface 14 downward through a bore 16 into the earth. The bore passes into the subterranean aquifer formations 18 and 20. A submersible or line-shaft turbine pump 22 is suspended on a pump column 24 at a desired depth in the water production well 10 so that the pump will be below the level of water 26 that enters the well. In normal operation, the pump 22 forces water upward through the pump column 24 to a municipal or other water system.

Most natural aquifer formations 18 and 20 contain various amounts of natural minerals that have the capacity to remove radionuclides from water. These minerals include oxides and hydroxides of iron and manganese, naturally occurring zeolites, and several less common materials that provide natural sorption sites or chemical bonding sites for radionuclides and other metals. Typical concentrations of these minerals in the aquifer formation 18 and 20 are only a few percent or less. However, even at such relatively low concentrations, these minerals provide sufficient exchange capacity to significantly reduce the radionuclide concentrations in the water produced from a well.

These naturally occurring materials sorb metals onto active sites in their mineral structures. Initially, most of these sorption sites are occupied by metals that commonly occur in the earth, such as calcium and magnesium. Water flowing through the aquifer formation causes various radionuclides to displace the more common metals from the sorption sites and then selectively occupy those sites. Typically, the aquifer formation minerals selectively sorb uranium, radium, thorium, and elements in the decay series of those elements from the flowing water. The increased ground water flow velocity caused by pumping water from the well 10 accelerates the sorption of radionuclides near that well. Over time, the sorption sites become saturated with the radionuclides which results in an enrichment of radionuclides in the aquifer formation.

The concentration of radionuclides in the aquifer formation 18 and 20 provides a reservoir of parent products of radium and gross alpha. As a result, radium and gross alpha are injected into the water, primarily through the process of alpha recoil from the parent isotopes sorbed on the aquifer formation 18 and 20. It is the concentration of the parent products on the saturated sorption sites in the aquifer formation that produces the majority of the radionuclides in water pumped from the water production well 10.

The present process regenerates the natural filtration ability of the aquifer formations 18 and 20 by injecting a leaching solution into the water production well 10 to chemically leach the radionuclides off the sorption sites in the aquifer formations 18 and 20. Alternatively, the leaching solution may be introduced into the aquifer through one or more a nearby treatment wells 30 that surround the water production well 10. The treatment of the aquifer formations 18 and 20 via treatment wells 30 may be in addition to or in place of injecting the leaching solution into the water production well 10 and enables a larger region of the aquifer formations to be treated. The regeneration traetment process occurs while the water production well 10 is taken out of service. The leaching solution can be pumped into the water production well 10 through the existing pump column 24 or though a conductor tube which is fed temporarily into the well with the open end below the water line. The water present in the well 10 or 30 is displaced by the leaching solution which then flows into adjacent regions of the aquifer formations 18 and 20.

Solutions of magnesium chloride, sodium chloride, sodium bicarbonate, calcium chloride, ethylenediaminetetraacetic acid (EDTA), or mixtures of these chemicals can be used as the leaching solution, for example. One skilled in the art will appreciate that this list is not all inclusive and that other materials can be employed to displace the radionuclides from the sorption sites in the aquifer minerals. In general, the leaching agents fall into several categories:

1. Solutions which displace uranium, radium, thorium, or their decay products from natural sorption sites in the aquifer formation.
2. Solutions which conduct leached radionuclides to a well for removal from the aquifer formation.
3. Solutions that leave easily exchangeable ions bound to active sorption sites in the aquifer formation.
4. Solutions which create an active treatment zone around a production well sufficient to reduce radionuclides in the water produced by a well without injecting or precipitating solids into the aquifer formation.
5. Solutions that reduce the concentration of parent products of radium and gross alpha in the formation around a well.
6. Solutions that reduce radionuclides levels in the water drawn from a well.

The quantity and concentration of the leaching solution that is used are functions of the characteristics of the aquifer formation, the water, the radionuclide concentrations, and the well construction and operation.

The leaching solution remains in a typical well 10 or 30 for a matter of minutes to a few hours. After that prescribed time, the leaching solution has left easily exchangeable metals on the sorption sites in place of the radionuclides that were previously present. This has the effect of creating the equivalent of an ion exchange bed within the aquifer formation in a region around the well, referred to as the "treatment zone." The size of the treatment zone can be varied depending on the desired level of treatment by adjusting the chemistry, concentration, contact time, and volume of the injected leaching solution.

Following the treatment period, the remaining leaching solution is pumped from the well 10 or 30 along with the leached radionuclides and the effluent is discharged into a sanitary sewer system for processing at a conventional waste water treatment facility. Other disposal options may be used. It should be understood that while the concentration of radionuclides in the effluent is above acceptable levels for drinking water, it is not above levels which can be processed safely by standard methods at waste water treatment plants. The specific conductivity of the effluent can be monitored as a field guide to determine when the leaching solution has been significantly removed from the well 10 and the adjacent aquifer formations 18 and 20. The radionuclide levels in samples of the effluent also can be tested to ensure that those materials have been satisfactorily exhausted.

After regeneration of the treatment zone, indigenous radionuclides once again selectively exchange with the metals on the sorption sites as water flows through the aquifer formations 18 and 20 into the production well 10. Eventually, the radionuclide levels on the aquifer formations 18 and 20 adjacent the production well 10 again become high enough to cause problematic concentrations in the well water. At such a time, the regeneration process is repeated to remove the accumulated radionuclides from the formation and reestablish the treatment zone around the well.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for treating an aquifer formation to remove radionuclides present in ground water being pumped from a well drilled into the aquifer formation, said method comprising:
   introducing a leaching solution into the aquifer formation adjacent the well, wherein the leaching solution displaces the radionuclides at natural sorption sites in the aquifer formation;
   allowing the leaching solution to remain in the aquifer formation for a period of time; and
   after the period of time, removing the leaching solution and displaced radionuclides from the aquifer formation.

2. The method as recited in claim 1 wherein the leaching solution comprises a substance that displaces uranium, radium, thorium, and their decay products from the sorption sites in the aquifer formation.

3. The method as recited in claim 1 wherein the leaching solution contains material selected from a group consisting of magnesium chloride, sodium chloride, sodium bicarbonate, calcium chloride, ethylenediaminetetraacetic acid, and mixtures thereof.

4. The method as recited in claim 1 wherein removing the leaching solution and displaced radionuclides comprises pumping liquid from the well until specific conductivity of that liquid has a given value.

5. The method as recited in claim 1 further comprising after removing the leaching solution and displaced radionuclides, pumping water from the well into a potable water system.

6. The method as recited in claim 1 wherein introducing a leaching solution into the aquifer formation comprises conveying the leaching solution from above ground through the well into the aquifer formation.

7. A method for treating an aquifer formation to remove radionuclides from ground water being pumped from a well drilled into the aquifer formation, said method comprising:

injecting a leaching solution into the aquifer formation through the well, wherein the leaching solution replaces the radionuclides at natural sorption sites in the aquifer formation with ions that are displaceable by other radionuclides in the ground water;

allowing the leaching solution to remain in the aquifer formation for a period of time; and after the period of time, pumping the leaching solution and replaced radionuclides from the well.

8. The method as recited in claim 7 wherein the leaching solution comprises a substance that displaces uranium, radium, thorium, and their decay products from the sorption sites in the aquifer formation.

9. The method as recited in claim 7 wherein the leaching solution contains material selected from a group consisting of magnesium chloride, sodium chloride, sodium bicarbonate, calcium chloride, ethylenediaminetetraacetic acid, and mixtures thereof.

10. The method as recited in claim 7 wherein pumping the leaching solution and replaced radionuclides from the well occurs until liquid pumped from the well has a specific conductivity of a given value.

11. The method as recited in claim 7 further comprising after pumping the leaching solution and replaced radionuclides, pumping water from the well into a potable water system.

12. A method for treating an aquifer formation to remove radionuclides present in ground water being pumped from a first well drilled into the aquifer formation, said method comprising:

injecting a leaching solution into the aquifer formation through a second well, wherein the leaching solution replaces the radionuclides at natural sorption sites in the aquifer formation with a substance which is displaceable by other radionuclides in the ground water;

allowing the leaching solution to remain in the second well for a period of time; and after the period of time, pumping the leaching solution and replaced radionuclides from at least one of the first well and the second well.

13. The method as recited in claim 12 wherein the leaching solution comprises a substance that displaces uranium, radium, thorium, and their decay products from the sorption sites in the aquifer formation.

14. The method as recited in claim 12 wherein the leaching solution contains material selected from a group consisting of magnesium chloride, sodium chloride, sodium bicarbonate, calcium chloride, ethylenediaminetetraacetic acid, and mixtures thereof.

15. The method as recited in claim 12 wherein pumping the leaching solution and replaced radionuclides from at least one of the first well and the second well occurs until liquid pumped from the second well has a given value of specific conductivity.

16. The method as recited in claim 12 further comprising after pumping the leaching solution and replaced radionuclides, pumping water from the first well into a potable water system.

* * * * *